(12) United States Patent
Akwani et al.

(10) Patent No.: US 6,449,420 B1
(45) Date of Patent: Sep. 10, 2002

(54) GERMANIUM SILICON OXYNITRIDE HIGH INDEX FILMS FOR PLANAR WAVEGUIDES

(75) Inventors: Ikerionwu Asiegbu Akwani, Corning, NY (US); Robert Alan Bellman, Painted Post, NY (US); Thomas Paul Grandi, Corning, NY (US); Paul Arthur Sachenik, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/068,968

(22) Filed: Feb. 7, 2002

Related U.S. Application Data

(62) Division of application No. 09/437,677, filed on Nov. 10, 1999, now Pat. No. 6,408,125.

(51) Int. Cl.$^7$ .................................................. G02B 6/00
(52) U.S. Cl. ...................... 385/142; 385/147; 428/336; 423/325; 437/24
(58) Field of Search ................................. 385/140–144, 385/147; 423/325; 428/336, 332, 469; 257/396; 437/24, 26, 27

(56) References Cited

U.S. PATENT DOCUMENTS

| 4,308,316 A | 12/1981 | Gordon |
| 5,210,801 A | 5/1993 | Fournier et al. |
| 5,395,771 A | 3/1995 | Nakato |
| 5,396,363 A | 3/1995 | Valette |
| 5,514,897 A | 5/1996 | Nakato |

FOREIGN PATENT DOCUMENTS

| FR | 2062743 | 6/1971 |
| JP | 2000-91079 | 3/2000 |
| WO | WO9723426 | 7/1997 |

OTHER PUBLICATIONS

"Visible photoluminescene from germanium implanted silicon oxynitride films after annealing under hydrostatic pressure" by Tyschenko et al., Engineering Info. Inc., Publication date year 2001.
Patent Abstracts of Japan; Publication No. 2000091079, Publication Date: Mar. 31, 2000; TDK Corp.
Patent Abstracts of Japan; Publication No.: 07196326, Publication Date: Aug. 1, 1995; Shinetsu Quartz Prod Co Ltd.

*Primary Examiner*—Akm E. Ullah
(74) *Attorney, Agent, or Firm*—Price, Heneveld, Cooper, DeWitt & Litton

(57) ABSTRACT

A composition represented by the formula $Si_{1-x}Ge_xO_{2(1-y)}N_{1.33y}$, wherein x is from about 0.05 to about 0.6 and y is from about 0.14 to about 0.74 exhibits properties highly suited for use in fabricating waveguides for liquid crystal based optical devices. In particular, the compositions have an index of refraction of from about 1.6 to about 1.8 for light at a wavelength of 1550 nm, and/or a coefficient of thermal expansion of from about $2.5 \times 10^{-6}°C^{-1}$ to about $5.0 \times 10^{-6°}C.^{-1}$. The compositions also have inherently low hydrogen content, and a high hydrogen permeability which allows better hydrogen removal by thermal annealing to provide a material which exhibits low optical losses and better etching properties than alternative materials.

6 Claims, 6 Drawing Sheets

GERMANIUM SILICON OXYNITRIDE HIGH INDEX FILMS FOR PLANAR WAVEGUIDES

CROSS-REFERENCE TO RELATED APPLICATION

This application is a divisional of U.S. application Ser. No. 09/437,677 entitled GERMANIUM SILICON OXYNITRIDE HIGH INDEX FILMS FOR PLANAR WAVEGUIDES, filed Nov. 10, 1999 now U.S. Pat. No. 6,408,125, the entire disclosure of which is incorporated herein by reference.

BACKGROUND OF THE INVENTION

1. Field of the Invention

This invention relates to materials for optical waveguides, and more particularly to waveguide materials having a relatively high index of refraction and/or a coefficient of thermal expansion which is nearly the same as the coefficient of thermal expansion of silicon.

2. Technical Background

Silicon oxynitride is a useful material for waveguides in planar photonic devices, as well as for barrier layers and dielectrics in displays and semiconductor devices. Silicon oxynitride is also of interest for use as a material for fabrication of photosensitive optical fiber. By varying the nitrogen/oxygen ratio, films with a wide range of refractive indices and thermal expansions can be produced. In particular, silicon oxynitride films with a high nitrogen content are of interest for planar waveguides in optical devices utilizing liquid crystals as an electro-optic material for total internal reflectance, in which a high refractive index (e.g., about 1.6 to about 1.8 for light at a wavelength of 1550 nm) planar waveguide is required.

Typically, silicon oxynitride is deposited by a chemical vapor deposition (CVD) technique, such as plasma enhanced chemical vapor deposition (PECVD) from the reaction of silane ($SiH_4$) and ammonia ($NH_3$). PECVD is favored for silicon oxynitride deposition because growth rates can be as high as 15 micron/hour. However, the reaction of silane and ammonia leads to the incorporation of large amounts of hydrogen (up to 20% for $Si_3N_4$) in the films. This has several undesirable effects. First, the incorporation of large amounts of hydrogen in the films results in high optical loss at 1550 nm. Another problem with incorporation of large amounts of hydrogen is that undesirable reduction-oxidation reactions occur between the hydrogen and surrounding materials. A further undesirable effect attributable to the incorporation of large amounts of hydrogen in a CVD deposited silicon oxynitride film is that such films cannot be as uniformly etched as films incorporating lower amounts of hydrogen.

When a large amount of hydrogen is present in a glass film formed by chemical vapor deposition, much of the hydrogen can usually be removed with heat treatment techniques. However, hydrogen is particularly difficult to thermally out-diffuse from a silicon oxynitride film formed by chemical vapor deposition because of the low permeability of hydrogen in the silicon oxynitride film. Unless careful and time-consuming procedures are followed, the films tend to blister and crack. The non-uniform dry-etching observed in high index silicon oxynitride films results from nanoscale (having a size of from about 1 nm to about 1 micron) structures that contain both porosity that entraps hydrogen, and dense highly strained regions. Thermal annealing to remove hydrogen, and relax and compact (densify) the. glass film is required to achieve uniform etch rates and precisely defined etched structures.

Another disadvantage with silicon oxynitride films deposited by CVD results from the large thermal expansion mismatch between silicon and silicon oxynitride films having an appropriate nitrogen content for achieving the high refractive index required for liquid crystal optical devices. This thermal mismatch leads to high film strains which cause birefringence in waveguides, substrate curvature, and can cause film cracking and/or delamination. Because of the disadvantages associated with incorporation of large amounts of hydrogen, and the large thermal expansion mismatch between silicon and silicon oxynitride films, the fabrication of planar photonic devices using high index silicon oxynitride derived from the reaction of silane and ammonia does not appear to be commercially viable.

Therefore, it would be highly desirable if a high refractive index waveguide material having a coefficient of thermal expansion which closely matches the coefficient of thermal expansion of silicon could be provided. It would also be highly desirable if a high refractive index waveguide material incorporating lower amounts of hydrogen and/or which could be more easily treated to remove incorporated hydrogen could be provided. Even more desirable, would be a high refractive index waveguide material which has both a coefficient of thermal expansion which closely matches the coefficient of thermal expansion of silicon, and which incorporates a relatively lower amount of hydrogen during chemical vapor deposition and/or allows easier removal of hydrogen incorporated during chemical vapor deposition.

SUMMARY OF THE INVENTION

The invention overcomes the problems inherent with high index silicon oxynitride films formed by chemical vapor deposition, and provides a commercially viable method of fabricating a high refractive index waveguide material. More specifically, the invention provides a germanium silicon oxynitride material having an inherently lower hydrogen content as deposited than silicon oxynitride; a higher hydrogen permeability than silicon oxynitride, which facilitates hydrogen removal; and a coefficient of thermal expansion which closely matches the coefficient of thermal expansion for silicon. These properties are extremely useful for fabricating optical devices based on total internal reflectance of liquid crystals.

In accordance with one aspect of the invention, a composition represented by the formula $Si_{1-x}Ge_xO_{2(1-y)}N_{1.33y}$ is provided wherein x is from about 0.05 to about 0.6 and y is from about 0.14 to about 0.74. Such compositions exhibit a relatively high index of refraction, and a coefficient of thermal expansion which closely matches the coefficient of thermal expansion for silicon.

In accordance with another aspect of the invention, the germanium silicon oxynitride composition has an index of refraction of from about 1.6 to about 1.8 for light at a wavelength of 1550 nm.

In accordance with another aspect of the invention, the germanium silicon oxynitride composition has a coefficient of thermal expansion of from about $2.5 \times 10^{-6}$ $°C.^{-1}$ to about $5.0 \times 10^{-6}$ $°C.^{-1}$.

In another aspect of the invention, a germanium silicon oxynitride film is deposited on a silicon substrate. The germanium silicon oxynitride film has an index of refraction of from about 1.6 to about 1.8 for light at a wavelength of 1550 nm, and a coefficient of thermal expansion of from about $2.5 \times 10^{-6}$ $°C.^{-1}$ to about $5.0 \times 10^{-6}$ $°C.^{-1}$.

In accordance with a further aspect of the invention, a germanium silicon oxynitride film deposited on a silicon substrate is represented by the formula $Si_{1-x}Ge_xO_{2(1-y)}N_{1.33y}$, wherein x is from about 0.05 to about 0.6 and y is from about 0.14 to about 0.74.

In accordance with another aspect of the invention, a process for forming a layer of glass having a relatively high index of refraction and a coefficient of thermal expansion which closely matches that of silicon is provided. The process includes the steps of providing a substrate, and depositing on the substrate a layer of material represented by the formula $Si_{1-x}Ge_xO_{2(1-y)}N_{1.33y}$, wherein x is from about 0.05 to about 0.6 and y is from about 0.14 to about 0.74.

DERAILED DESCRIPTION OF THE PREFERRED EMBODIMENT

The germanium silicon oxynitride compositions of this invention are represented by the formula $Si_{1-x}Ge_xO_{2(1-y)}N_{1.33y}$, wherein x is from about 0.05 to about 0.6 and y is from about 0.14 to about 0.74. Such compositions can be formed by chemical vapor deposition of germane ($GeH_4$), silane ($SiH_4$), nitrous oxide ($N_2O$) and ammonia ($NH_3$). The germanium silicon oxynitride glasses deposited by chemical vapor deposition in accordance with this invention have a relatively high index of refraction, while exhibiting more favorable properties than silicon oxynitride films having a comparable index of refraction. More specifically, the germanium silicon oxynitride glasses of this invention have a significantly lower hydrogen content when deposited than silicon oxynitride films having a comparable index of refraction. They also have a higher hydrogen permeability than silicon oxynitride having a comparable index of refraction, and a coefficient of thermal expansion which is more closely matched to the coefficient of thermal expansion of silicon. The inherently lower hydrogen content as deposited for the germanium silicon oxynitride glasses results in lower optical losses at 1550 nm than are exhibited by a comparable silicon oxynitride film, a decrease in undesirable reduction-oxidation reactions, and more uniform etching. The higher hydrogen permeability of the germanium silicon oxynitride glasses of this invention allows faster, easier and more thorough hydrogen removal by thermal annealing after deposition. The coefficient of thermal expansion of the germanium silicon oxynitride glasses of this invention allow fabrication of high index waveguides on silicon with reduced film strains, which reduces or eliminates the possibility of strain-induced birefringence in optical waveguides. Also, by more closely matching the refractive index of the deposited germanium silicon oxynitride glasses to the coefficient of thermal expansion of a silicon substrate, the reduction in film strains also leads to reduced substrate curvature, whereby the possibility of film cracking or delamination is eliminated, or at least very substantially reduced.

Figure 1:
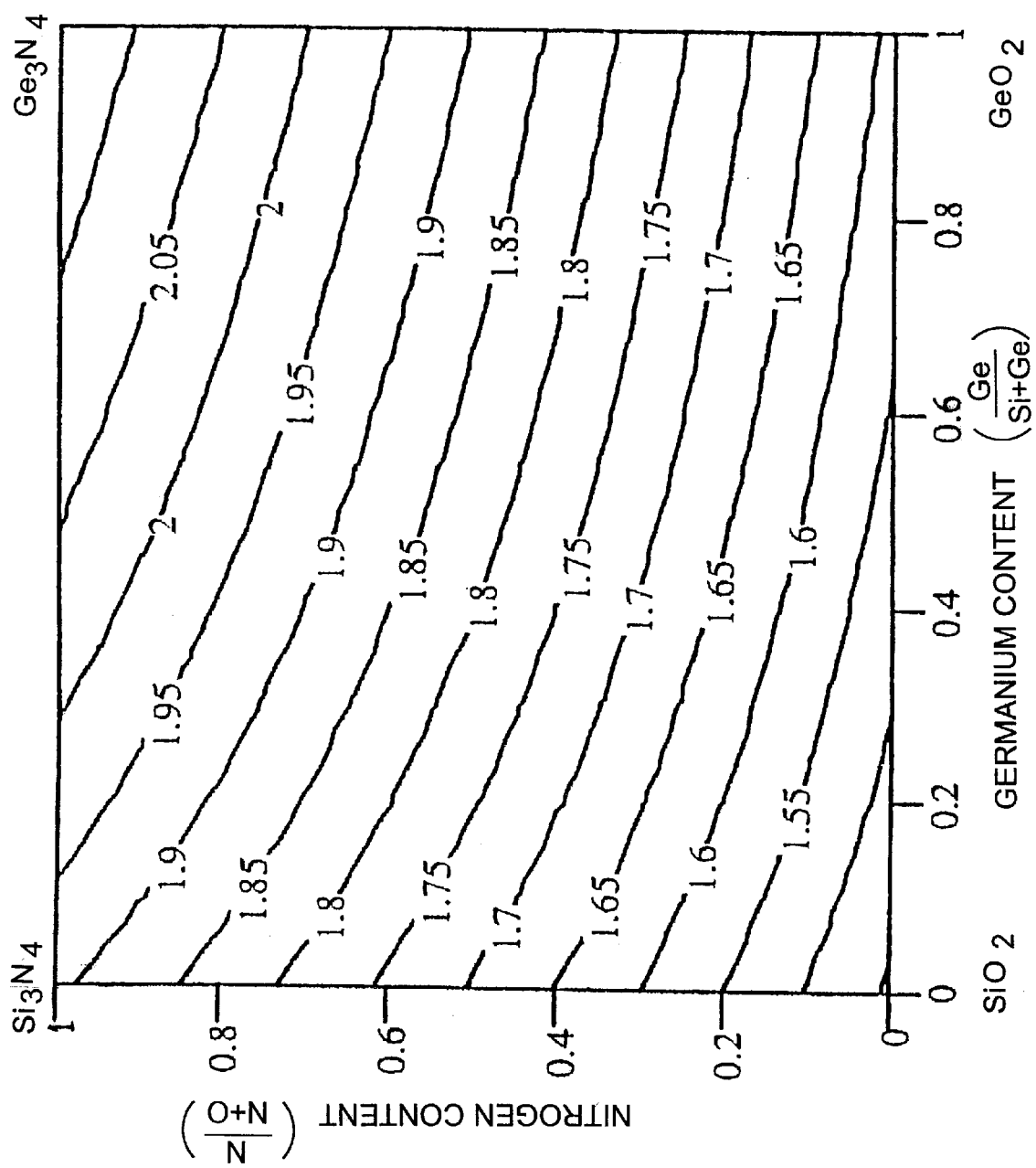
FIG. 1 is a graph representing estimated refractive indicies at 1550 nm for germanium silicon oxynitride compositions.

Properties, such as refractive index, of germanium silicon oxynitride as a function of composition are represented graphically as shown in FIG. 1, wherein the abscissa represents the ratio of germanium to germanium plus silicon (i.e., Ge/(Si+Ge)), and the ordinate represents the ratio of nitrogen to nitrogen plus oxygen (i.e., N/(N+O)). The lower left hand corner of the graph (FIG. 1) represents pure silica ($SiO_2$), the lower right hand corner represents pure germania ($GeO_2$), the upper left hand corner represents pure silicon nitride ($Si_3N_4$), and the upper right hand corner represents pure germanium nitride ($Ge_3N_4$). Properties for the compounds represented at the corners of the graph, $SiO_2$, $GeO_2$, $Si_3N_4$ and $Ge_3N_4$, are listed in Table 1.

TABLE 1

| Refractive index and thermal expansion data for GeSiON end members. | | | |
|---|---|---|---|
| | n(632) | n(1550) | $\alpha *10^7$ ° $C.^{-1}$ | Density (g/cc) |
| $SiO_2$ | 1.4578 | 1.444 | 7 | 2.63 |
| $GeO_2$ | 1.650 | 1.587 | 64 | 4.228 |
| $Si_3N_4$ | 1.95 | 1.91 | 30 | 3.1 |
| $Ge_3N_4$ | 2.23 | 2.14 | ? | 5.25 |

Figure 2:
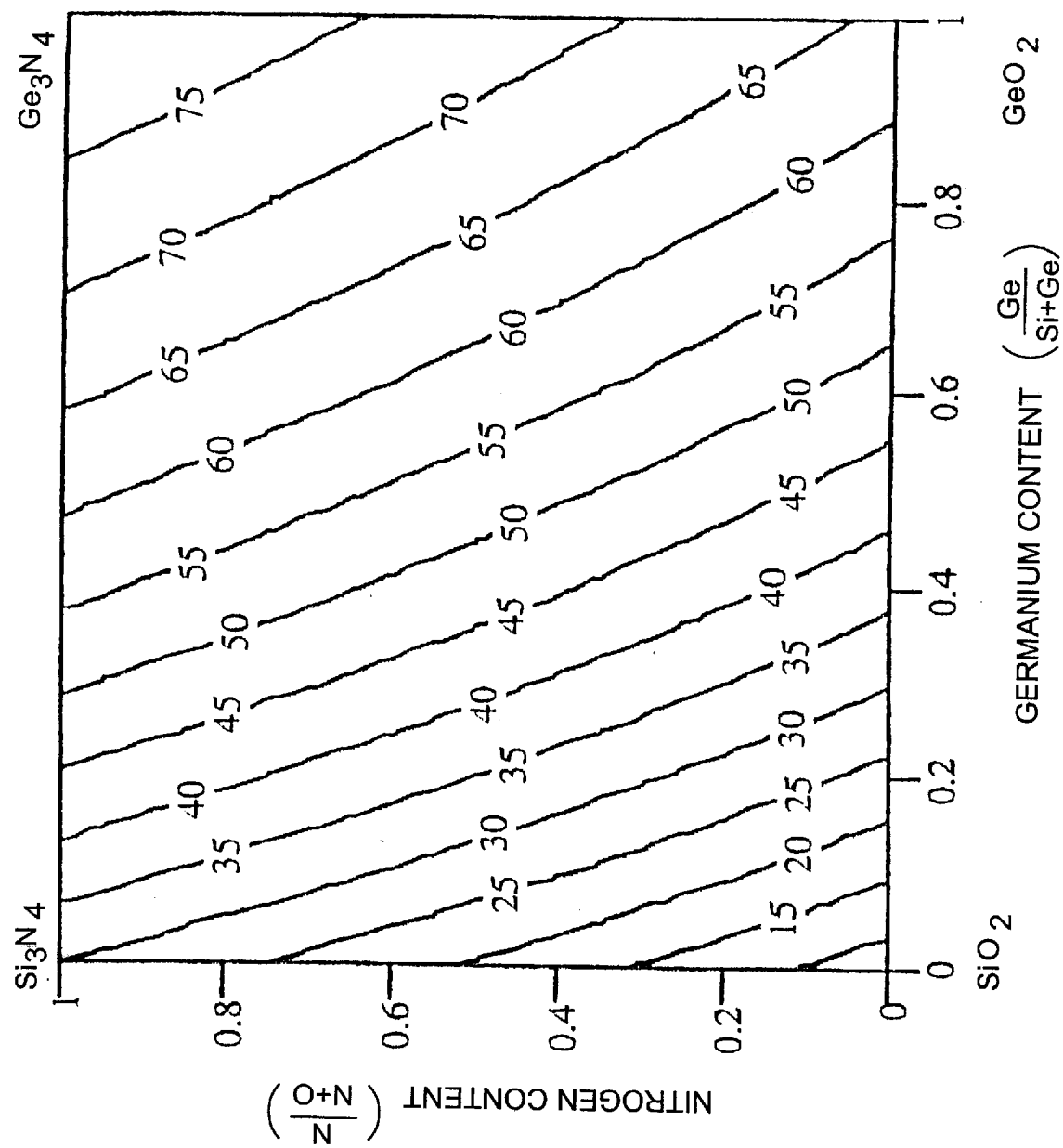
FIG. 2 is a graph representing estimated coefficients of thermal expansion for germanium silicon oxynitride compositions.

The surface contour lines shown in FIG. 1 represent estimated refractive index at 1550 nm for germanium silicon oxynitride compositions based on the properties of $SiO_2$, $GeO_2$, $Si_3N_4$ and $Ge_3N_4$. In FIG. 2, the surface contour lines represent estimates of thermal expansion for germanium silicon oxynitride compositions. The values indicated in Table 2 and FIG. 2 are expressed in linear units of expansion per ten million linear units per °C. (e.g., in/$10^7$ in/°C.).

Figure 3:
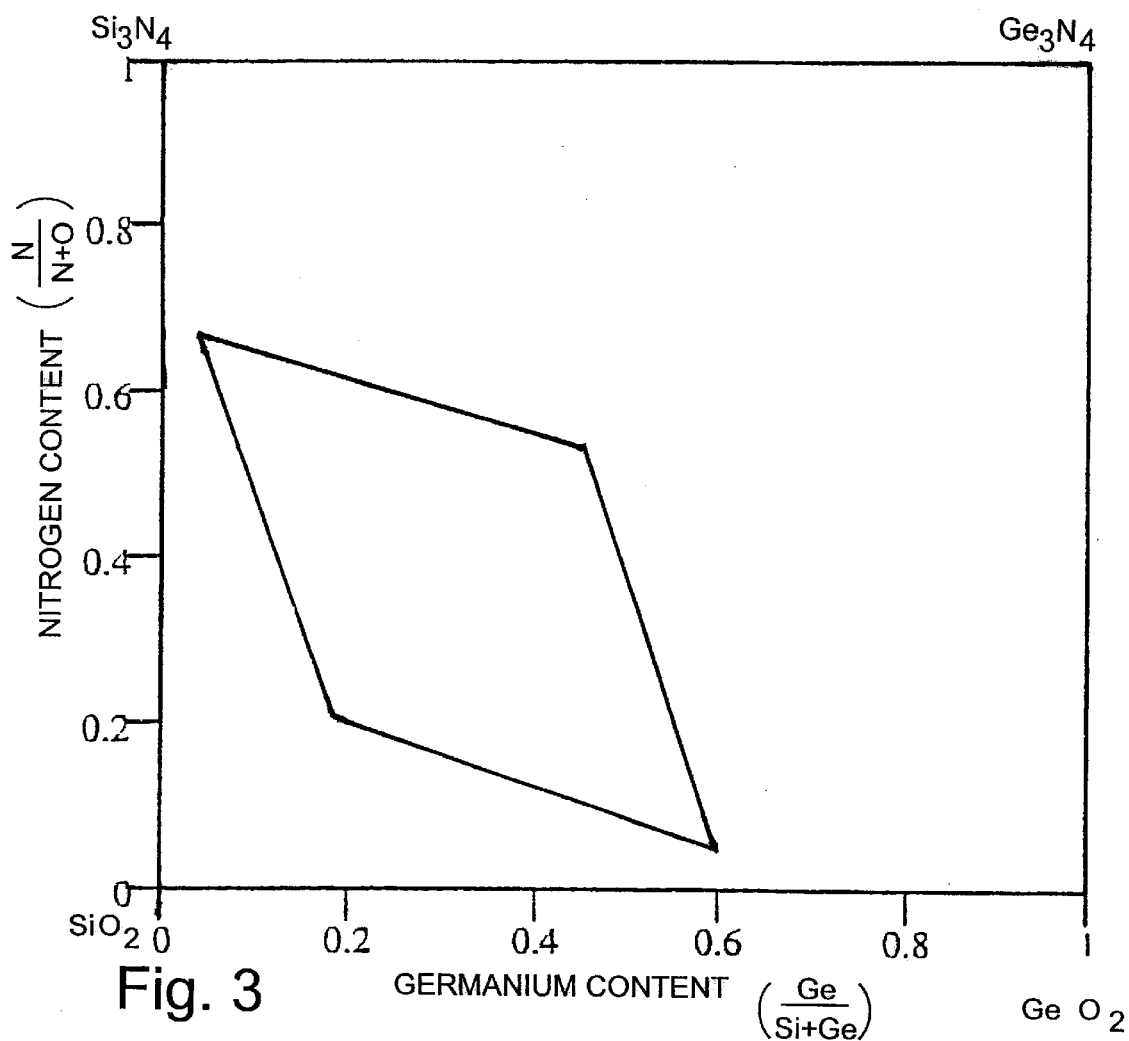
FIG. 3 is a graph representing a region of primary interest defined by the overlap of regions in FIGS. 1 and 2 which have an index of refraction of from about 1.6 to about 1.8 at 1550 nm, and a coefficient of thermal expansion of from about $2.5 \times 10^{-6}$ °$C.^{-1}$ to about $5.0 \times 10^{-6}$ °$C.^{-1}$.

For optical devices based on total internal reflectance of liquid crystals, a refractive index of from about 1.6 to about 1.8 at the wavelength of interest (typically about 1550 nm) is required. For silicon oxynitride, this refractive index range is achieved by increasing the nitrogen content of the glass. However, increasing nitrogen content also increases hydrogen content. By substituting germanium for silicon, the refractive index of the glass may be increased while incorporating substantially less hydrogen. From FIG. 1, it can be seen that an index of refraction in the range of from about 1.6 to about 1.8 can be achieved over a diagonal range of compositions starting from mostly silicon nitride rich glass to mostly germanium oxide rich glass. The thermal expansion of this range varies from about 1.5 to about 2.5 ppm per °C. ($15 \times 10^{-7}$ °$C.^{-1}$ to $25 \times 10^{-7}$ °$C.^{-1}$) for the silicon glass that is mostly nitride, and from about 6.0 to about 7.0 ppm per °C. ($60 \times 10^{-7}$ °$C.^{-1}$ to $70 \times 10^{-7}$ °$C.^{-1}$) for a germanium glass that is mostly oxide. By overlapping a composition range in which the coefficient of thermal expansion is closely matched to the coefficient of thermal expansion for silicon (about 3.7 ppm per °C.) with a composition range having the desired refractive index range, estimates of the compositions of most interest for optical devices based on total internal reflectance of liquid crystals may be derived, as shown in FIG. 3. The region of primary interest is estimated to be centered at a Ge/(Ge+Si) ratio of about 0.3 and a N/(N+)) ratio of about 0.4. More specifically, the region R of interest shown in FIG. 3 approximately encompasses those compositions of germanium silicon oxynitride having an index of refraction at 1550 nm of from about 1.6 to about 1.8, and a coefficient of thermal expansion of from about $2.5 \times 10^{-6°}$ C.$^{-1}$ to about $5.0 \times 10^{-6°}$ C.$^{-1}$ (i.e., from about 2.5 ppm per °C. to about 5.0 ppm per °C.).

Planar waveguiding films appropriate for optical devices may be deposited by numerous techniques including physical vapor deposition (PVD) processes including sputtering, electron beam evaporation, molecular beam epitaxy, and laser ablation, or by chemical vapor deposition (CVD) processes including flame hydrolysis deposition (FHD), atmospheric pressure chemical vapor deposition (APCVD), low pressure chemical vapor deposition (LPCVD), plasma enhanced chemical vapor deposition (PECVD), and chemical beam epitaxy. For typical planar optical devices having an index of refraction which is matched to the index of refraction of an optical fiber, flame hydrolysis deposition (FHD) and PECVD have been the most widely utilized methods because of low waveguiding propagation losses and excellent compositional and thickness uniformity. The germanium silicon oxynitride films of this invention may be applied using generally any of the physical vapor deposition processes or any of the chemical vapor deposition processes, with preferred deposition processes including PECVD and LPCVD.

Figure 7:
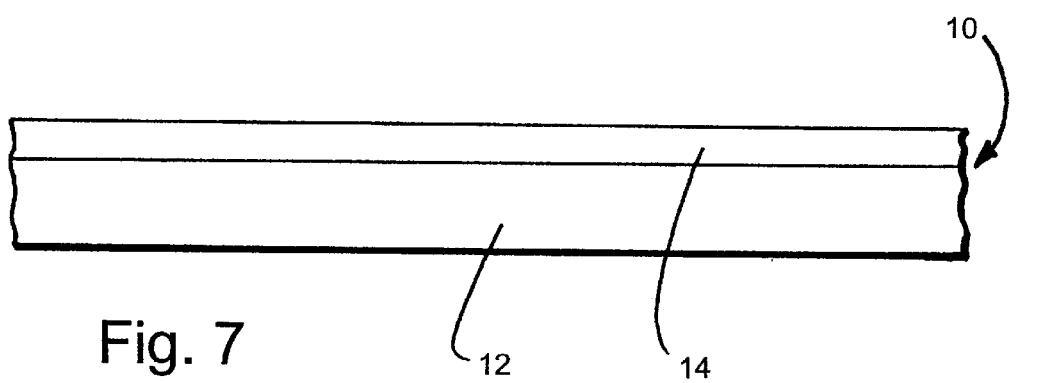
FIG. 7 is a schematic sectional view of a germanium silicon oxynitride film of the present invention deposited on a substrate.

In accordance with an aspect of this invention, a planar optical device is prepared from a precursor article 10 (FIG. 7) comprising a germanium silicon oxynitride film 12 deposited on a silicon substrate 14. The germanium silicon oxynitride film 12 has an index of refraction of from about 1.6 to about 1.8 for light at a wavelength of 1550 nm, and a coefficient of thermal expansion of from about $2.5 \times 10^{-6°}$ C.$^{-1}$ to about $5.0 \times 10^{-6°}$ C.$^{-1}$. Germanium silicon oxynitride film 12 deposited on silicon substrate 14 using a CVD or PVD deposition process is represented by the formula $Si_{1-x}Ge_xO_{2(1-y)}N_{1.33y}$, wherein x is from about 0.05 to about 0.6 and y is from about 0.14 to about 0.74.

After the germanium silicon oxynitride film has been deposited, it is preferably thermally annealed to remove hydrogen. Effective annealing temperature range from about 600° C. to about 1000° C., with suitable annealing times ranging from about 3 minutes to about 1000 minutes. The annealing process is preferably conducted at a partial pressure of oxygen which is very low, preferably less than about 10–30 atmospheres.

EXAMPLES

Chemical Vapor Disposition

A plasma enhanced chemical vapor deposition process was used for deposition of germanium silicon oxynitride films having properties appropriate for optical devices based on total internal reflectance of liquid crystals. These films were deposited by PECVD using a parallel plate reactor with a heated stationary platten, a low frequency (375 kHz) RF generator and matching network, and a gas manifold supplying silane, germane, nitrous oxide, ammonia, and nitrogen into the process chamber through a showerhead nozzle which uniformly distributes the reactive gases. The process conditions for the samples are listed in Table 2.

TABLE 2

Process conditions for PECVD GeSiON films

| | Glass Flow rate (sccm) | | | | | Temperature | | Pressure | Deposition |
|---|---|---|---|---|---|---|---|---|---|
| sample | 5% SiH4 | 2% GeH4 | N2O | NH3 | RF (w) | Substrate | Showerhead | (mtorr) | Time (min) |
| 1 | 400 | 0 | 2000 | 0 | 400 | 300 | 200 | 550 | 40 |
| 2 | 400 | 0 | 50 | 300 | 400 | 350 | 225 | 500 | 40 |
| 3 | 300 | 125 | 50 | 300 | 400 | 350 | 225 | 500 | 40 |
| 4 | 350 | 63 | 50 | 300 | 400 | 350 | 225 | 500 | 40 |
| 5 | 200 | 250 | 50 | 300 | 400 | 350 | 225 | 500 | 40 |
| 6 | 350 | 63 | 70 | 200 | 400 | 350 | 225 | 500 | 40 |
| 7 | 200 | 250 | 70 | 200 | 400 | 350 | 225 | 500 | 40 |
| 8 | 350 | 63 | 200 | 200 | 400 | 350 | 225 | 500 | 40 |
| 9 | 200 | 250 | 200 | 200 | 400 | 350 | 225 | 500 | 40 |
| 10 | 0 | 500 | 200 | 200 | 400 | 350 | 225 | 500 | 40 |
| 11 | 400 | 0 | 0 | 300 | 400 | 350 | 225 | 500 | 40 |
| 12 | 0 | 500 | 0 | 300 | 400 | 350 | 225 | 500 | 40 |

Film surface morphology was examined by scanning electron microscopy (SEM) and atomic force microscopy (AFM). The thickness and reactive index of each of the films was determined by a prism coupling system. The composition was determined by electron microprobe, and the hydrogen concentration was determined by both Fourier Transform Infrared Spectroscopy (FTIR) and proton solid state nuclear magnetic resonace ($^1$H-SSNMR). Compositions of the germanium silicon oxynitride films were mapped to an idealized hydrogen free compound represented by the formula $Si_{1-x}Ge_xO_{2(1-y)}N_{1.33y}$. Film stress was determined from measurements of wafer curvature using Stoney's equation. See Milton Ohring, *The Materials Science Of Thin Films*, Academic Press, Boston (1992), pp. 416–420. Some error in stress measurements is expected because the curvature of the substrates was not measured prior to deposition. The results of microprobe, prism coupling, FTIR, and wafer curvature measurements are listed in Table 3.

TABLE 3

Composition and properties of PECVD GeSiON Films

| sample | WT. % ELEMENT | | | | Compositional Map $Si_{(1-x)}Ge_xO_{2(1-y)}N_{4/3*y}$ | | n(632) | n(1550) | Growth (micron/hr) | [NH1/t] | Stress (MPa) |
|---|---|---|---|---|---|---|---|---|---|---|---|
| | Si | Ge | N | O | x | y | | | | | |
| 1 | — | — | — | — | 0 | 0 | 1.4571 | 1.4439 | 14.072 | 0 | |
| 2 | 50.855 | 0.001 | 33.831 | 11.659 | 0.000 | 0.768 | 1.7663 | 1.7413 | 8.63 | 0.0739 | −860.1 |
| 3 | 39.096 | 19.819 | 29.976 | 9.526 | 0.164 | 0.782 | 1.8131 | 1.7837 | 7.50 | 0.0828 | −2988 |
| 4 | 45.631 | 9.083 | 31.707 | 11.027 | 0.072 | 0.767 | 1.7788 | 1.7517 | 8.35 | 0.0762 | 82.35 |
| 5 | 27.253 | 37.354 | 24.899 | 7.860 | 0.347 | 0.783 | 1.8815 | 1.8460 | 6.70 | 0.0732 | −7350 |
| 6 | 45.010 | 8.910 | 28.036 | 14.761 | 0.071 | 0.684 | 1.7420 | 1.7168 | 9.05 | 0.0744 | 651.3 |
| 7 | 28.488 | 35.268 | 21.820 | 12.045 | 0.324 | 0.674 | 1.8221 | 1.7887 | 7.85 | 0.0740 | 207.4 |
| 8 | 43.891 | 8.474 | 22.481 | 22.659 | 0.070 | 0.531 | 1.6736 | 1.6513 | 9.71 | 0.0655 | 1396 |
| 9 | 27.906 | 34.169 | 16.829 | 19.462 | 0.321 | 0.497 | 1.7343 | 1.7059 | 8.49 | 0.0619 | 971.1 |
| 10 | 0.771 | 69.398 | 6.634 | 21.468 | 0.972 | 0.261 | 1.7315 | 1.7037 | 7.57 | 0.0495 | |
| 11 | 58.639 | 0.002 | 35.220 | 0.197 | 0.000 | 0.995 | 1.9514 | 1.9132 | 11.6406 | 0.0481 | |
| 12 | 0.719 | 76.528 | 17.535 | 1.952 | 0.976 | 0.911 | 2.2294 | 2.1446 | 3.6092 | 0.1535 | |

SEM micrographs of the surface and cross section of film Sample 9, and an AFM image of a region of the surface of film Sample 9 were evaluated to determine that the films were smooth and uniform as deposited. X-ray diffraction was used to determine that the films were amorphous as deposited. The quantity of hydrogen-nitrogen bonds normalized to thickness was determined using FTIR, and the results are listed in Table 3 under the heading "[NH]/t".

Figure 4:
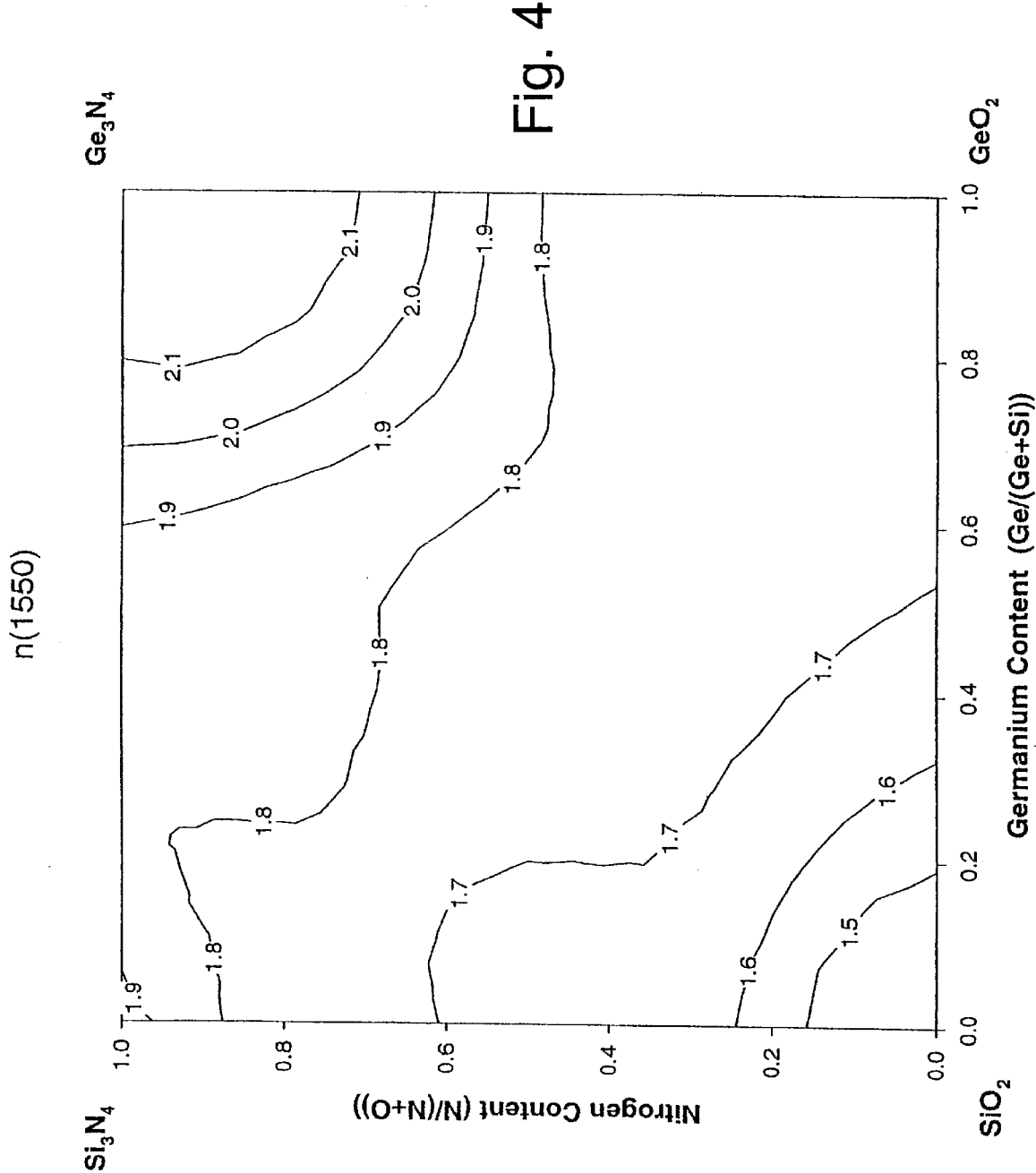
FIG. 4 is a graph of surface contours generated from a second order polynomial least squares fit of data for index of refraction at 1550 nm for germanium silicon oxynitride as a function of film composition.
Figure 5:
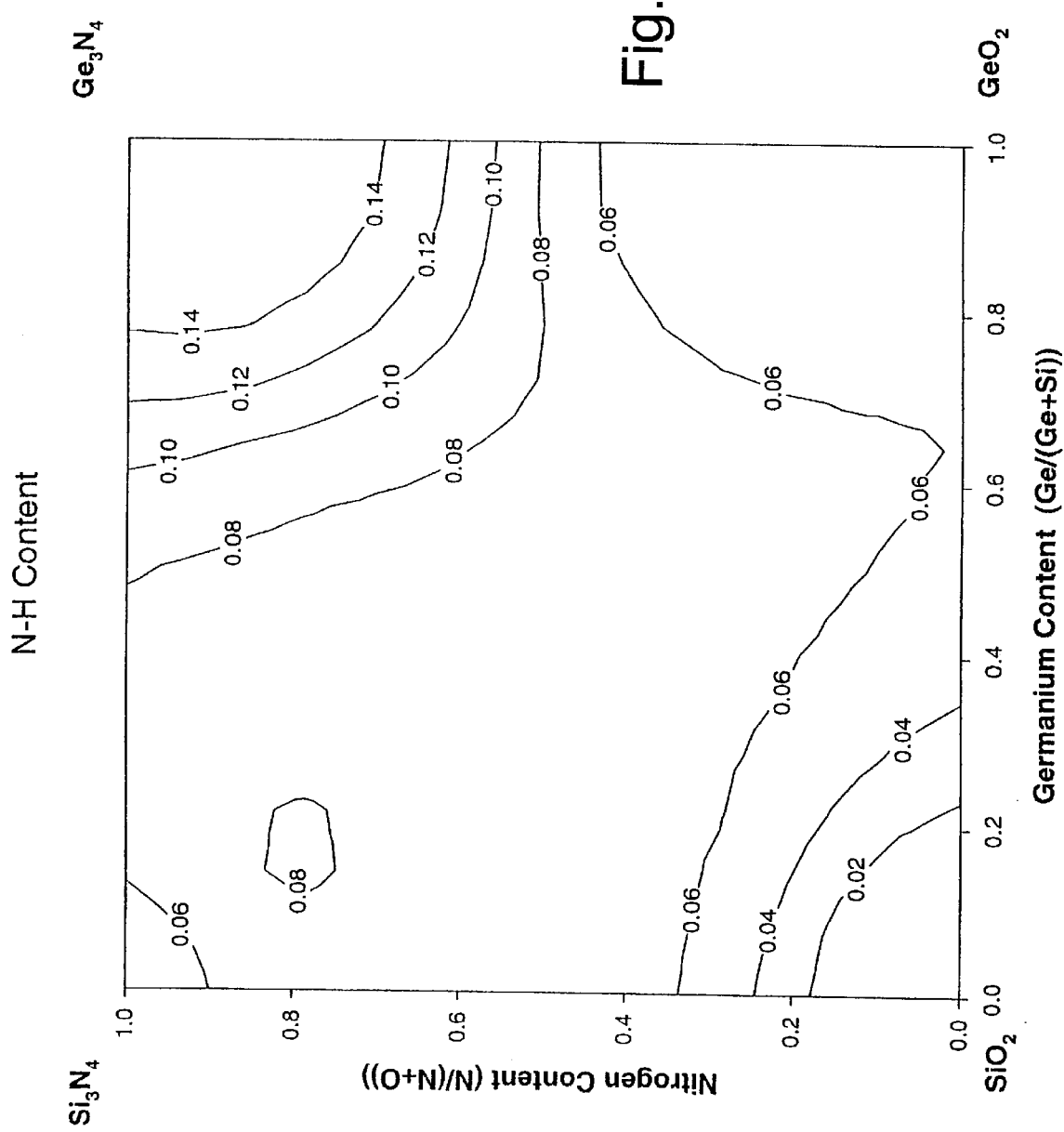
FIG. 5 is a graph of surface contours generated from a second order polynomial least squares fit of data for hydrogen-nitrogen bond concentration normalized to film thickness for germanium silicon oxynitride as a function of film composition.
Figure 6:
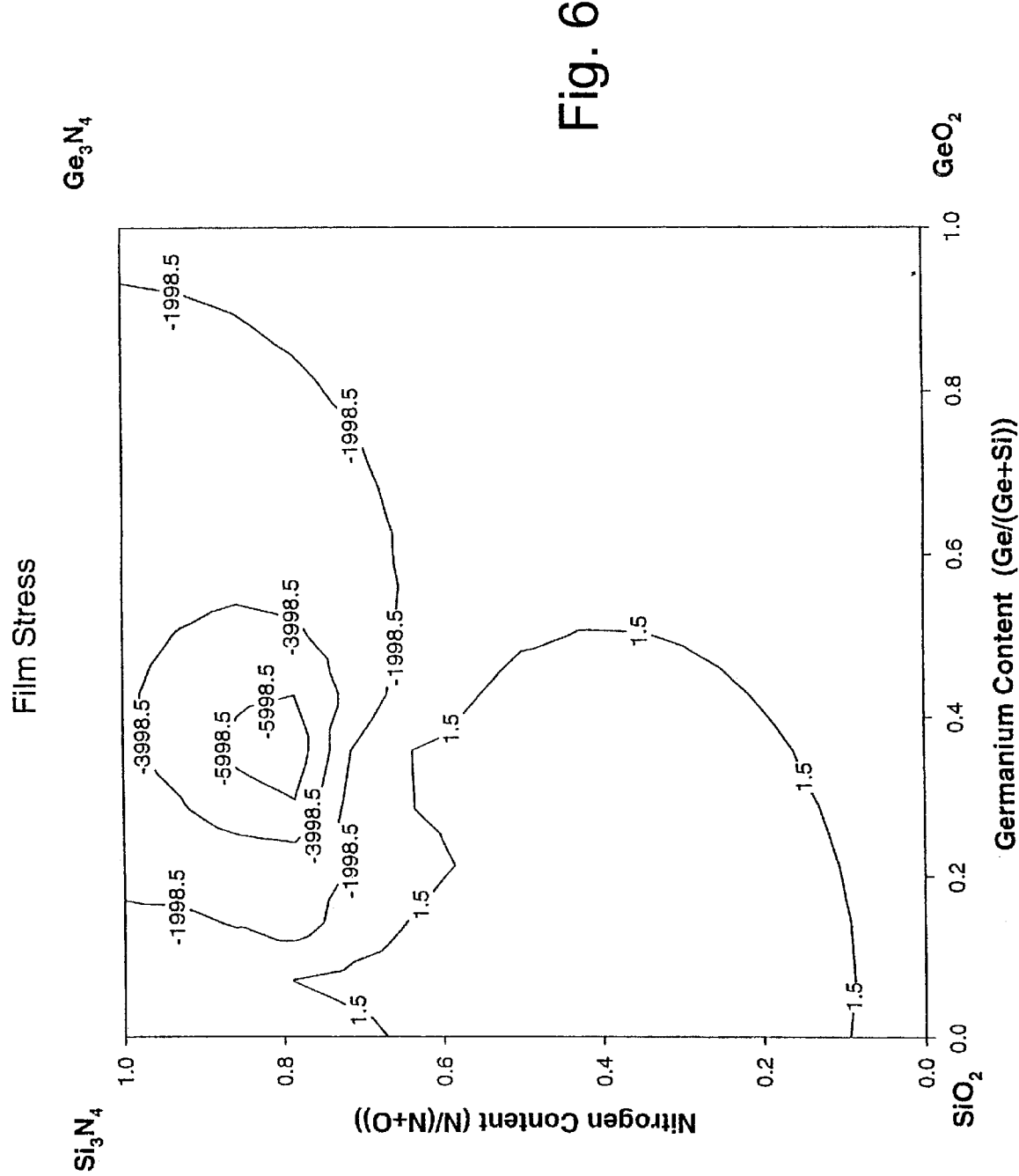
FIG. 6 is a graph of surface contours generated from a second order polynomial least squares fit of data for stress as a function of film composition.

A first and second order polynomial least squares fit was performed on the data listed in Table 3 to relate the film composition to the index of refraction at 632 nm, the index of refraction at 1550 nm, the growth rate in microns per hour, the relative concentration of nitrogen-hydrogen bonds normalized to thickness, and the stress in MPa. The results of the polynomial least squares fits are shown in Table 4, and the resulting surface contours for refractive index at 1550 nm, relative nitrogen-hydrogen bond content, and film stress are illustrated in FIGS. 4, 5 and 6, respectively. The regions of the graphs shown in FIGS. 4, 5 and 6 which indicate compositions which produce desirable refractive index, stress and hydrogen content coincide very closely with the region R of interest shown in FIG. 3.

TABLE 4

First and second order coefficients for least squares fit of film properties to composition

| | n(632) | n(1550) | Growth Rate | [NH1/t] | Stress |
|---|---|---|---|---|---|
| First order coefficients | | | | | |
| ax | 0.2875 | 0.2533 | −5.4486 | 0.0522 | −11235 |
| by2 | 0.5328 | 0.4957 | −5.4086 | 0.0880 | −18449 |
| m | 1.3792 | 1.3798 | 13.6070 | −0.0011 | 13588 |
| Variance | 0.0025 | 0.0017 | 1.9334 | 0.0004 | 3823343 |
| Second order coefficients | | | | | |
| ax2 | 0.0056 | −0.0128 | −0.10941 | 0.0991 | −43477 |
| by2 | 0.2897 | 0.26782 | 13.6750 | −0.1920 | −155140 |
| cxy | 0.2359 | 0.1743 | −4.8525 | 0.1442 | −82553 |
| dx | 0.1461 | 0.1664 | −2.2165 | −0.1348 | 63415 |
| ey | 0.1820 | 0.1824 | −17.7390 | 0.2445 | 198920 |
| m | 1.4617 | 1.4479 | 14.8880 | −0.0009 | −62017 |
| Variance | 0.0004 | 0.0003 | 0.6445 | 0.0000 | 1530399 |

Annealing

PECVD deposited germanium silicon oxynitride films were annealed by two processes. Initially, films were annealed in a muffle furnace in air by bringing the furnace to a desired temperature and quickly inserting the sample into the hot furnace. The sample was then removed from the hot furnace when the desired time had elapsed. Table 5 lists the results of annealing films of Sample 9 by this process. Annealing experiments at temperatures up to 700° C. for 830 minutes resulted in a 20% reduction in the relative concentration of hydrogen-nitrogen bonds normalized to thickness. However, this reduction in hydrogen content was accompanied by a 1.2% decrease in the index of refraction, and a 1.5% decrease in thickness. This is believed to result from oxidation of the film, and perhaps volatilization of SiO and GeO. An Ellingham diagram (not shown) calculated from the oxidation of silicon nitride into silica indicated that for annealing at 1000° C., a partial pressure of oxygen less than $10^{-30}$ atmospheres is desired to prevent oxidation.

TABLE 5

Annealing of T041699B GeSiON in air

| Temp (C.) | Time (min) | n(632) | n(1550) | thickness | [NH1/thick] |
|---|---|---|---|---|---|
| 0 | 0 | 1.7251 | 1.6978 | 5.8105 | 0.0609 |
| 600 | 23 | 1.7166 | 1.6901 | 5.7181 | 0.0635 |
| 600 | 285 | 1.7133 | 1.6862 | 5.7184 | 0.0610 |
| 600 | 960 | 1.7123 | 1.6868 | 5.7241 | 0.0599 |
| 700 | 960 | 1.7015 | 1.6772 | 5.6926 | 0.0511 |
| 725 | 990 | 1.7059 | 1.6805 | 5.7225 | 0.0458 |
| 750 | 990 | 1.7114 | 1.6851 | 5.6596 | 0.0353 |
| 800 | 3 | 1.7113 | 1.6877 | 5.7304 | 0.0534 |
| 650 | 830 | 1.7078 | 1.6829 | 5.7638 | 0.0545 |
| 700 | 830 | 1.7037 | 1.6793 | 5.7267 | 0.0496 |

Germanium silicon oxynitride films were also annealed in vacuum using a pyrolytic boron nitride substrate heater in a small stainless steel chamber evacuated by a dual stage rotary pump to a pressure of about 50 mtorr. Table 6 lists the results of annealing films of Sample 9 by this process. Vacuum annealing of germanium silicon oxynitride films was shown to be highly effective in removal of hydrogen incorporated during deposition. FTIR indicates that vacuum annealing for 30 minutes at 750° C. removed 85% of the incorporated hydrogen bonded to nitrogen, and solid state NMR shows all detectable hydrogen (both N—H and Si—H) was removed.

TABLE 6

Annealing of T041699B GeSiON in vacuum

| Temp (C.) | Time (min) | n(632) | n(1550) | Thickness | [NH]/thick |
|---|---|---|---|---|---|
| 0 | 0 | 1.7251 | 1.6978 | 5.8105 | 0.0609 |
| 750 | 30 | | 1.7566 | 5.9594 | 0.0112 |

The compositions of germanium silicon oxynitride of this invention are appropriate for fabrication of waveguides for liquid crystal planar optical devices. The only competitive material and process for deposition of high refractive index (from about 1.6 to about 1.8) waveguides for liquid crystal based optical devices for which equipment is commonly available is PECVD deposited silicon oxynitride. Compared to silicon oxynitride, the PECVD deposited germanium silicon oxynitride glasses of this invention have significantly lower hydrogen content as deposited, and higher hydrogen permeability which enables better hydrogen removal by thermal annealing. Further, the germanium silicon oxynitride glasses of this invention can be nearly expansion matched to silicon, which allows fabrication of high index waveguides on silicon. These properties make these films highly appropriate for optical devices based on total internal reflectance of liquid crystals.

It will become apparent to those skilled in the art that various modifications to the preferred embodiment of the invention as described herein can be made without departing from the spirit or scope of the invention as defined by the appended claims.

What is claimed is:

1. An optical waveguide including a core comprising a composition represented by the formula $Si_{1-x}Ge_xO_{2(1-y)}N_{1.33y}$, wherein x is from about 0.05 to about 0.6 and y is from about 0.14 to about 0.74.

2. The optical waveguide of claim 1, wherein the core has an index of refraction of from about 1.6 to about 1.8 for light at a wavelength of 1550 nm.

3. The optical waveguide of claim 1, wherein the composition has a coefficient of thermal expansion of from about $2.5 \times 10^{-6\circ}$ C.$^{-1}$ to about $5.0 \times 10^{-6\circ}$ C.$^{-1}$.

4. The optical waveguide of claim 2, wherein the composition has a coefficient of thermal expansion of from about $2.5 \times 10^{-6\circ}$ C.$^{-1}$ to about $5.0 \times 10^{-6\circ}$ C.$^{-1}$.

5. An optical waveguide including a core comprising a composition of germanium silicon oxynitride having an index of refraction of from about 1.6 to about 1.8 for light at a wavelength of 1550 nm.

6. The optical waveguide of claim 5, wherein the core has a coefficient of thermal expansion of from about $2.5 \times 10^{-6\circ}$ C.$^{-1}$ to about $5.0 \times 10^{-6\circ}$ C.$^{-1}$.

\* \* \* \* \*

UNITED STATES PATENT AND TRADEMARK OFFICE
CERTIFICATE OF CORRECTION

PATENT NO.    : 6,449,420 B1
DATED         : September 10, 2002
INVENTOR(S)   : Ikerionwu A. Akwani et al.

It is certified that error appears in the above-identified patent and that said Letters Patent is hereby corrected as shown below:

Column 1,
Line 67, after "the" delete -- . --.

Column 3,
Line 27, after "5.0 x $10^{-6}$ °C. $^{-1}$." should be -- 5.0 x $10^{-6}$ °C. $^{-1}$; --.

Column 4,
Lines 24, 25, 26, 27 and 29, "comer" should be -- corner --.

Column 7,
Line 35, "fits" should be -- fit --.
Line 49, "[NH1/t" should be -- [NH]/t --.

Column 8,
Line 5, "[NH1/t" should be -- [NH]/t --.
Line 42, "[NH1/thick" should be -- [NH]/thick --.

Column 9,
Line 42, "[NH1/thick" should be -- [NH]/thick --.

Signed and Sealed this

Fifteenth Day of April, 2003

JAMES E. ROGAN
*Director of the United States Patent and Trademark Office*